Patented Nov. 3, 1931

1,830,320

UNITED STATES PATENT OFFICE

ERIC T. HESSLE, OF LEMONT, ILLINOIS, ASSIGNOR OF ONE-HALF TO EDGAR H. WOELFEL, OF MORRIS, ILLINOIS

SYNTHETIC TANNING MATERIALS AND PROCESS OF MAKING THE SAME

No Drawing.  Application filed May 31, 1928.  Serial No. 282,044.

This invention relates to synthetic tanning materials and to a process of making the same from mineral oils such as petroleum and shale oils.

Tanning materials have heretofore been made synthetically from various organic sources, as from the lignosulpho acids present in cellulose waste sulphite liquors, the condensation products of sulphonated phenols, phenolic bodies, naphthalenes and retenes with aldehydes and from aromatic compounds having alkyl sulphonic acid groups.

It has also been suggested in Patent #1,236,468 that the "acid resins" obtained in the usual refining step of treating crude petroleum oil and crude distillates with concentrated sulphuric acid, can be isolated and used as tanning material. According to Leo Gurwitsch, "Wissen-schaftliche Grundlagen der Erdolverarbeitung", Zweite Auflage, 1924, page 274, treatment of unsaturated hydrocarbons with concentrated sulphuric acid either in small or large quantities results in the formation principally of water insoluble polymerization products of asphaltic and heavy oil-like nature, and in the formation of sulphuric acid ethers, neutral sulphuric acid esters and sulphuric acid esters, having only a single hydrogen atom substituted.

Gurwitsch further points out, page 288, that using 2% sulphuric acid at 20° C., the amount of so-called sulphonic acids formed is about 1.30% by weight of the total acid sludge, which itself contains mostly free sulphuric acid. In the usual refining processes, about 0.4% of sulphuric acid by weight is used to refine kerosene, about 0.3% in the refining of gasoline, and between 2.5 and 4% in the case of lubricating oils.

Fuming sulphuric acid is not used in the ordinary refining processes, since it tends to form oil-soluble sulphonated products which discolor rather than bleach the oils, a procedure which would require a redistillation step. Only in extraordinary cases and in the case of medicinal oils, as vaseline oils, petrolatum and Russan white oils is such an expensive and special treatment as that with fuming sulphuric acid employed.

Because sulfuric acid esters contained in the acid sludge resemble sulfonic acids in their physical action, they have been according to Gurwitsch erroneously termed "sulphonic acids". Chemically they show an entirely different structure and reactions from the more stable sulphonic acids. They are compounds which form, like true sulphonic acids, emulsions with the oils. In this specification sulfuric acid esters are referred to as "so-called sulphonic acids." "Acid resins", obtained from the "acid resin sludge" resulting from the sulphuric acid treatment, would accordingly be comprised of a certain quantity of so-called sulphonic acids of the hydrocarbons and large quantities of polymerized water insoluble products with only a very small percentage, if any, of true sulphonic acids. Sulphuric acid esters are not suited for use in tanning processes because of their tendency to break down into water insoluble hydrocarbons containing an OH group and free sulphuric acid in a short time. The free sulphuric acid tends to decompose the fiber of the tanned leather and destroy its quality.

I have now found that if mineral oils, and particularly such oils as contain a substantial percentage of unsaturated aliphatic hydrocarbons, are treated with a relatively very large quantity of oleum at below ordinary temperaures a sulfonated product of quite different character from that disclosed in Patent No. 1,236,468, and one which has valuable tanning qualities, is produced. The production of tanning materials is the main product of my process; the undecomposed acid treated paraffins and aromatic hydrocarbons are produced as by-products.

It is therefore an object of this invention to provide a process of making synthetic tanning materials from such cheap and plentiful raw materials as mineral oils containing unsaturated aliphatic hydrocarbons, olefinic hydrocarbons, naphthenes and the like.

It is a further object of this invention to provide a sulfonated hydrocarbon product of colloidal or semi-colloidal nature in a clear water solution derived from mineral oils without the formation of sulphuric acid esters and insoluble polymerization products.

It is a further object of this invention to produce a tanning material having a much lower sulfonic acid content than synthetic tanning material of aromatic nature now on the market and having a relatively high content of neutral undissociated colloidal bodies.

It is a further important object of this invention to provide a relatively cheap synthetic tanning material having a quicker penetration than heretofore known tanning agents and therefore effective in shortening the tanning period required, with resulting saving in time, labor and tanning equipment.

Another object of this invention is to produce a synthetic tanning material that, unlike the tanning materials derived from coal tar, will be odorless and therefore will not impart an undesirable odor to the tanned leather.

Other and further important objects of this invention will become apparent from the following description and appended claims.

While in general the synthetic tanning material of my invention can be produced from most mineral oils, such oils as have a high unsaturated hydrocarbon content prove most satisfactory. This is particularly fortunate since in general oils having a high unsaturated hydrocarbon content do not command so high a price as saturated oils for use in the manufacture of kerosene, lubricating oils and the like, and therefore the raw material for my process is comparatively very cheap. Natural petroleum oils which run around 50% unsaturated content are especially suitable for use as the starting material in my process. It is obvious, however, that my process is also applicable to unsaturated aliphatic hydrocarbons, such as olefines, in a substantially pure state unmixed with the saturated paraffin hydrocarbons.

In treating a mineral oil, as for instance a petroleum containing about 50% of unsaturated hydrocarbons, the oil is first topped to remove the gasoline and freed from asphalt residues in the usual manner. The kerosene, which does not contain olefines to any extent is left in the oil, since it will dissolve the heavier undecomposed hydrocarbons after sulfonation and prevent the formation of emulsions. The oil is then sulfonated at a relatively low temperature, preferably around 0° C., with oleum. In my preferred method the oil is run very slowly through a needle valve into oleum, containing from 15 to 30% free $SO_3$, maintaining the acid in a well agitated cooled condition during the addition of the oil.

Approximately three parts of oleum are used to every four parts by volume of oil. The addition of the oil to the acid takes place over a period of approximately 12 hours when a sulfonator of 900 gallons capacity is used, after which the sulfonation mass is allowed to stand an additional five hours or so. Upon standing, the mass separates into a bottom layer containing dark acid substances and a top layer comprised of the unsulfonated heavy hydrocarbons such as the paraffins dissolved in the kerosene.

The top layer is removed by decantation or other method and may be fractionated after neutralizing and washing into the various distillates, such as kerosene and others.

The acid layer is run into a large lead lined tank containing water in an amount sufficient to produce approximately a 30° Bé. solution after all of the acid syrup has been added. During the addition of the acid syrup, the diluted mass is kept at around room temperatures, with an upper limit of say 30° C. A separation due to the salting out effect of the sulfuric acid is thus effected, whereby two layers are formed, the upper comprising a black, gummy water soluble mass, and the lower a water solution of the sulfuric acid. The purpose of adjusting the density of the diluted solution to approximately 30 to 33° Bé. is to render the sulfonation products substantially insoluble and to obtain the lowest possible concentration of the acid to maintain a just sufficient differential between the specific gravity of the acid and of the black gummy mass to cause the latter to float upon the acid. The correct dilution of the mass may be obtained either by first charging the tank with a calculated amount of water or by subsequent dilution after the sulfonation mass has been run into the tank. Sufficient water should in all events be placed in the tank before running in the sulfonation mass to prevent excessive heating up due to the reaction between the sulfuric acid and the water.

The lower acid layer is drained and the black, gummy mass, containing approximately 30% of the 30° Bé. sulfuric acid, is dissolved in water until the organic content (organic dry residue) amounts to approximately 20 to 25% of the diluted mass. The free sulfuric acid content of the diluted mass is then calculated and sufficient soda ash added to neutralize all of the free sulfuric acid without neutralizing the organic sulfonic acids present.

Perhaps the most satisfactory method of calculating the free sulfuric acid in the diluted mass is to take a small aliquot sample from the plant batch, neutralize it and precipitate the organic matter with albumin by acidifying with hydrochloric acid. The sample is then filtered and the free sulfuric acid determined upon the filtrate with barium chloride.

The neutralized sulfonated products, if desired, are further diluted to form a clear transparent colloidal water suspension containing approximately 15% by weight of organic material and 4 to 5% of sodium sulfate.

In order to prevent too great swelling of the hides when this tanning material is used, due to the dissociation of the sulfonic acids, it is advisable to have an appreciable quantity of neutral salts present, such as sodium sulfate, to depress the tendency of the sulfonic acids to dissociate. This result may be accomplished most readily by leaving, during the draining step, a considerable quantity of sulfuric acid in the sulfonation mass and then neutralizing this sulfuric acid with soda ash.

I have found that my product retains rather a disagreeable odor, probably due to ethereal oils, unless special steps are taken to remove it. This can be done by blowing steam through the finished mass of the sulfonated products under vacuum, or by allowing the ethereal oils to rise to the surface and then skimming them off.

A certain small proportion of the total organic matter in my product comprises sulfonic acids and the balance, largely sulfones. The latter are neither salts nor acids, but entirely neutral bodies. If the sulfones are isolated they will be found to be soluble in ether, chloroform and benzol, but not in water or alcohol.

The sulfonic acids, however, are those acids with one replaceable H-atom and are soluble in both water and alcohol. They have the peculiar ability of rendering the sulfones water miscible to form a clear colloidal suspension. Both the sulfones and the sulfonic acids are in themselves tanning agents in that they both precipitate gelatin. These sulfonic acids do not form free sulphuric acids upon hydrolysis as the sulphuric acid esters do. To a certain extent these sulfonic acids may be fused with alkali to form phenols.

I may also neutralize or partially neutralize the sulfonic acids by an alkali. While a completely neutralized sulfonated product has little if any tanning capacity, such a neutralized product may be used together with small quantities of organic acids, such as lactic or acetic acid, with satisfactory results. The finished product shows a colloidal nature inasmuch as when it is passed through a membrane only a water white or very slightly discolored clear solution penetrates the membrane. Upon analysis of the portion that passes the membrane, sodium sulphate is found.

I may also obtain my tanning material in a dry, powdered form by evaporating the water solution to dryness in vacuo, as in a vacuum drum dryer.

The exact composition of the sulfonated products resulting from a process such as above described is almost impossible of determination and will vary greatly in accordance with the nature of the mineral oil used as a raw material. It was found that some aromatic hydrocarbons are formed during the above mentioned acid treatment.

My tanning material can be used directly for tanning harness, shoe, washable and other types of leather, or it can be used in conjunction with a vegetable tanning such as quebracho, hemlock, chestnut and the like. When a mixture of approximately two parts of my tanning material and one part of quebracho is employed, the tanning process for split leather can be completed in around six and one-half hours and a light, good colored leather produced of high tensile strength. good plumping, mellow feel, and of lower water solubility than in the case of vegetable tanned leather.

Some of the many advantages of my synthetic tanning material are: that it has a much quicker penetrating quality with resulting saving in time, labor and equipment; and that my tanning material can be produced from plentiful raw materials at a relatively low cost.

I am aware that numerous details of the process may be varied through a wide range without departing from the principles of this invention, and I, therefore, do not purpose limiting the patent granted hereon otherwise than necessitated by the prior art.

I claim as my invention:

1. The process of preparing tanning materials, which comprises treating mineral oils containing unsaturated aliphatic hydrocarbons with oleum containing 20 to 30% free sulfuric acid anhydride at a relatively low temperature to form sulfonated products composed principally of sulfones with relatively small quantities of sulfonic acids and adding water to said sulfonated products, thus forming a clear colloidal water suspension of said sulfonated products containing substantially no free sulfuric acid.

2. The process of preparing tanning materials, which comprises treating a mineral oil of a high unsaturated hydrocarbon content with oleum in the cold to form sulfonated oily products composed principally of sulfones with relatively small quantities of sulfonic acids, separating the sulfonated products from the unconverted oils and the major portion of the acid, neutralizing the free acid in said products and adding water to said products, thus forming a colloidal water suspension of said sulfonated products for use in tanning.

3. The process of preparing tanning materials, which comprises allowing a mineral oil free of asphalt and having a high unsaturated hydrocarbon content to run into an agitated quantity of oleum while maintaining the acid at a relatively low temperature to form principally sulfones with relatively small quantities of sulfonic acids and adding water to said sulphones and sulfonic acids, thus forming a colloidal water suspension of said sulfones and sulfonic acids.

4. The process of preparing tanning materials, which comprises allowing a mineral oil free of asphalt and having a high unsaturated hydrocarbon content to run into an agitated quantity of oleum containing 20 to 30% free sulfuric acid anhydride while maintaining the acid at a relatively low temperature to form sulfones and sulfonic acids, diluting the acid mixture with water to a point at which layer separation of the mixed sulfones and sulfonic acids occurs, effecting a separation of the sulfones and sulfonic acids from a part of the mineral acid and neutralizing the free mineral acid in the mixture of sulfones and sulfonic acids, thus recovering a water suspension of said sulfones and sulfonic acids.

5. The process of preparing tanning materials, which comprises allowing a mineral oil free of asphalt and having a high olefine content to run into an agitated quantity of oleum containing 20 to 30% free sulfuric acid anhydride maintained at a relatively low temperature, allowing the sulfonation mass to stand, separating unsulfonated portions from the mass, diluting the remaining mass with water to a point at which separation into layers occurs, removing one of said layers containing sulfones and sulfonic acids and a part of the mineral acid and neutralizing that part of the mineral acid mixed with the sulfones and sulfonic acids, thus recovering the latter in the form of a colloidal water suspension.

6. The process of preparing tanning materials, which comprises allowing a mineral oil free of asphalt and having a high olefine content to run into an agitated quantity of oleum containing 20 to 30% free sulfuric acid anhydride maintained at a relatively low temperature, allowing the sulfonation mass to stand, separating unsulfonated portions from the mass, running the remaining mass into water, while maintaining the temperature of the diluted mass at around room temperature, until approximately 30° Bé. mineral acid solution results, a separation into layers occurring at this point, removing one of said layers containing sulfones, sulfonic acids and a part of the mineral acid and neutralizing that part of the mineral acid mixed with the sulfones and sulfonic acids, thus recovering the sulfones and sulfonic acids.

7. A synthetic tanning material, comprising a colloidal water suspension of sulfones and sulfonic acids derived from unsaturated aliphatic hydrocarbons free of substantial amounts of mineral acids.

8. A synthetic tanning material comprising a colloidal water suspension of sulfonated products derived from mineral oils and containing principally normally water insoluble sulfones.

9. A synthetic tanning material, comprising sulfonated products composed principally of sulfones and sulfonic acids derived from unsaturated aliphatic hydrocarbons.

10. A synthetic tanning material, comprising a clear, colloidal water suspension of sulfonated products composed principally of sulfones and sulfonic acids derived from unsaturated aliphatic hydrocarbons, said solution containing substantially no free sulfuric acid and having a dry organic content of between 15 and 25%.

11. The process of preparing materials adapted for use as tanning agents, which comprises treating a mineral oil relatively high in unsaturated hydrocarbons and having a boiling range above that of gasoline and freed from aliphatic residues with oleum at around 0° C., maintaining oil and acid mixture in an agitated cooled condition, allowing the mixture to stand, whereby separation into layers takes place, removing the top layer containing unsulfonated heavy hydrocarbons, diluting the lower layer containing acid substances, whereby further separation into layers occurs, isolating the lower acid layer resulting from said further separation and neutralizing the free sulfuric acid therein, whereby a water dispersion of sulfones and sulfonic acids is obtained.

12. A composition of matter comprising a water dispersion of sulfones and sulfonic acids derived from unsaturated aliphatic hydrocarbons and having tanning properties.

13. The process of preparing sulfonated products adapted for use as tanning agents, which comprises gradually running a mineral oil high in unsaturated hydrocarbon content, having a boiling range above that of gasoline and freed from asphaltic residues into oleum, maintaining the reaction mass during the addition of the oil in an agitated cooled condition, allowing the mass to stand to effect separation into layers, removing the top layer containing unsulfonated heavy hydrocarbons, diluting the lower layer containing acid substances to effect further separation thereof into layers, isolating the lower of said resulting layers and neutralizing the free sulfuric acid therein, thereby obtaining a water dispersion of hydrocarbon sulfones and sulfonic acids.

14. The process of preparing sulfonated products adapted for use as tanning agents, which comprises gradually running a mineral oil high in unsaturated hydrocarbon content, having a boiling range above that of gasoline and freed from asphaltic residues into oleum in the ultimate proportion of about 4 volumes of oil to 3 volumes of oleum, maintaining the reaction mass during the addition of the oil in an agitated cooled condition, allowing the mass to stand to effect separation into layers, removing the top layer containing unsulfonated heavy hydrocarbons, diluting the lower layer containing acid substances to effect further separation thereof into layers, isolating the lower of said resulting layers and neutralizing the free sulfuric acid therein, thereby obtaining a water dispersion of hydrocarbon sulfones and sulfonic acids.

15. In the process of preparing sulfonated products adapted for use as tanning agents, the step which comprises very gradually introducing unsaturated aliphatic hydrocarbons having a boiling range above that of gasoline and freed from asphaltic residues into a body of fuming sulfuric acid containing from 15 to 30% free sulfuric acid anhydride, the oleum and resulting reaction mass being agitated and maintained at about 0° C. during such introduction of oil.

16. A composition of matter comprising a water dispersion of sulfone and sulfonic acid bodies having tanning properties, said bodies being derived from unsaturated aliphatic hydrocarbons by reaction with oleum at temperatures around 0° C.

In testimony whereof I have hereunto subscribed my name.

ERIC T. HESSLE.